Figure 1:
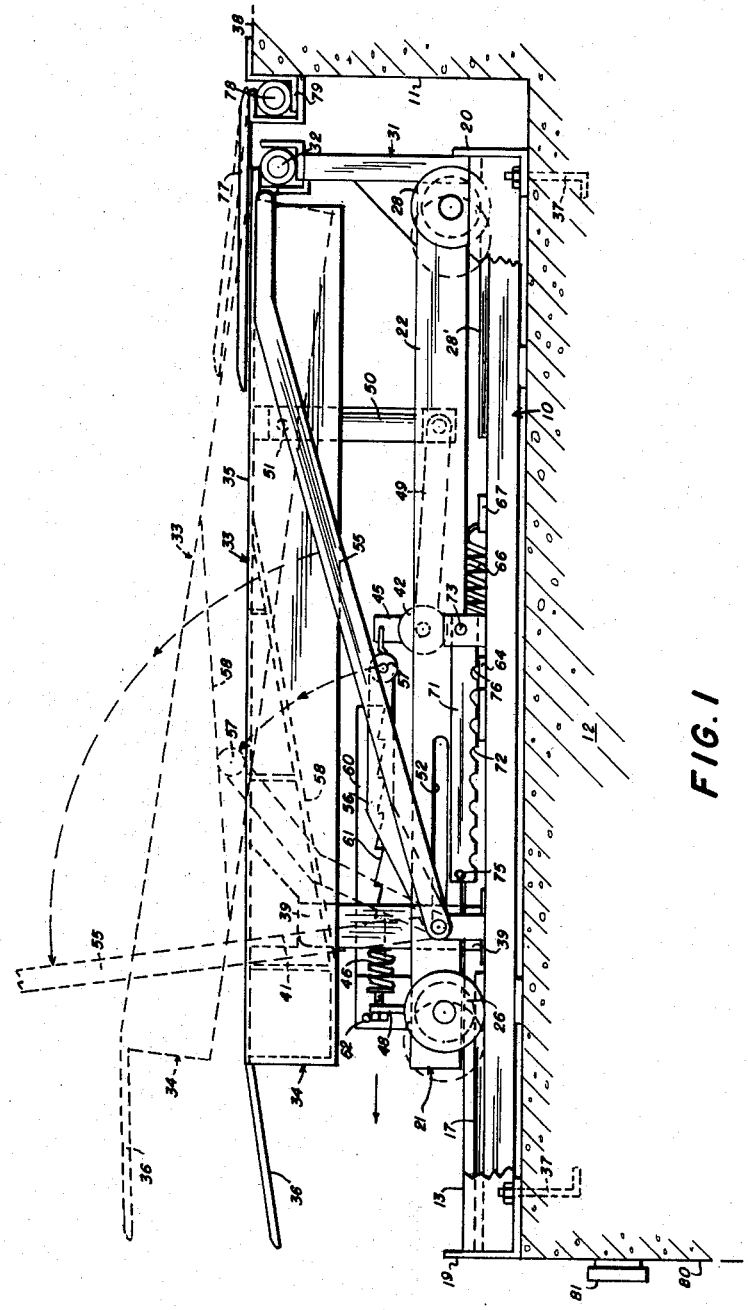

Jan. 8, 1963

R. L. LE CLEAR 3,071,790

MANUALLY OPERATED DOCKBOARD

Filed Aug. 1, 1960

4 Sheets-Sheet 1

INVENTOR
ROBERT L. LeCLEAR

BY
ATTORNEYS

Jan. 8, 1963  R. L. LE CLEAR  3,071,790
MANUALLY OPERATED DOCKBOARD
Filed Aug. 1, 1960  4 Sheets-Sheet 4

INVENTOR.
ROBERT L. LeCLEAR
BY Jacobi & Jacobi
ATTORNEYS

United States Patent Office 3,071,790
Patented Jan. 8, 1963

3,071,790
MANUALLY OPERATED DOCKBOARD
Robert L. Le Clear, Albion, Mich., assignor to T & S Equipment Co., Albion, Mich., a corporation of Michigan
Filed Aug. 1, 1960, Ser. No. 46,695
8 Claims. (Cl. 14—71)

This invention relates to warehouse or loading platform equipment and more particularly to a dockboard for installation in a loading platform, which dockboard includes a ramp which is normally on a level with the remainder of the loading platform and located inwardly of the outer edge thereof, but which may be raised and moved outwardly of the loading platform and thereafter lowered onto the body of a truck for facilitating loading or unloading material from the loading platform to the truck body. After completion of the loading or unloading operation the dockboard may be retracted inwardly of the outer edge of the loading platform and lowered into normal position.

Heretofore numerous types of dockboards have been proposed and utilized and some of these are power operated and relatively complex and costly and while these may be entirely suitable for relatively large and active installations, nevertheless, the same are far too costly and complex for use in connection with small warehouses or loading platforms where the dockboard might only be used occasionally and would not warrant the installation of a costly automatically operable model. Manually operated dockboards have also been previously proposed and utilized, but in many instances, these were relatively difficult to operate and furthermore, were subject to frequent damage due to engagement therewith by a truck or other vehicle backing into position and in many instances, the use of such prior art manually operated dockboards was limited to trucks of a certain height and also necessitated accurate positioning of the truck with relation to the loading platform in order that the dockboard would properly engage the body thereof.

It is accordingly an object of the invention to provide a manually operated dockboard which may be conveniently and economically constructed from readily available materials and conveniently installed in a loading platform or other location and which may be operated to position the ramp of the dockboard on the body of a truck by operation of a single lever, such lever being operable to raise the ramp and move the same forwardly over the body of the truck and thereafter lower the same onto the body for loading or unloading operations.

A further object of the invention is the provision of a manually operated dockboard, including a ramp which is normally level with the loading platform in which the dockboard is installed, the other edge of the ramp also normally being located flush or inwardly of the outer edge of the loading platform in order to prevent inadvertent damage to the dockboard by engagement therewith with a truck body when backing into position.

A still further object of the invention is the provision of a manually operated dockboard, including a ramp and a single operating lever which may be operated to raise the ramp, move the same forwardly over the body of a truck, lower the same onto the body of the truck, there being latch means for maintaining the ramp in forward position over the body of the truck and upon completion of the loading or unloading operation the latch means may be released to permit the ramp to return automatically to normal position even with the surface of the loading platform in which the same is installed.

Another object of the invention is the provision of a manually operated dockboard including a ramp which may be raised, moved forwardly over the body of a truck and lowered onto the body of the truck for loading or unloading operations and in which the weight of the ramp is at least partially counterbalanced by adjustable tension spring means incorporated in the structure of the dockboard.

A further object of the invention is the provision of a manually operated dockboard including a ramp and in which the ramp is normally level with the loading platform in which the same is installed and the outer edge of the ramp is normally flush with or inwardly of the outer edge of the loading platform, there being means provided for moving the ramp outwardly of the loading platform a desired distance in accordance with the position of a truck body to be loaded or unloaded, the dockboard including latch means for releasably holding the ramp in forward position and upon release of the latch means adjustable tension spring means is provided for automatically returning the ramp to normal position flush with or inwardly of the outer edge of the loading platform thereby preventing inadvertent damage to the dockboard.

A still further object of the invention is the provision of a manually operated dockboard which is entirely self-contained and requires only the provision of an upwardly and outwardly opening recess in a loading platform to permit installation of the dockboard, no part of the dockboard projecting above the level of the platform when the dockboard is not in use thereby permitting utilization of the full area of the loading platform.

Figure 2:
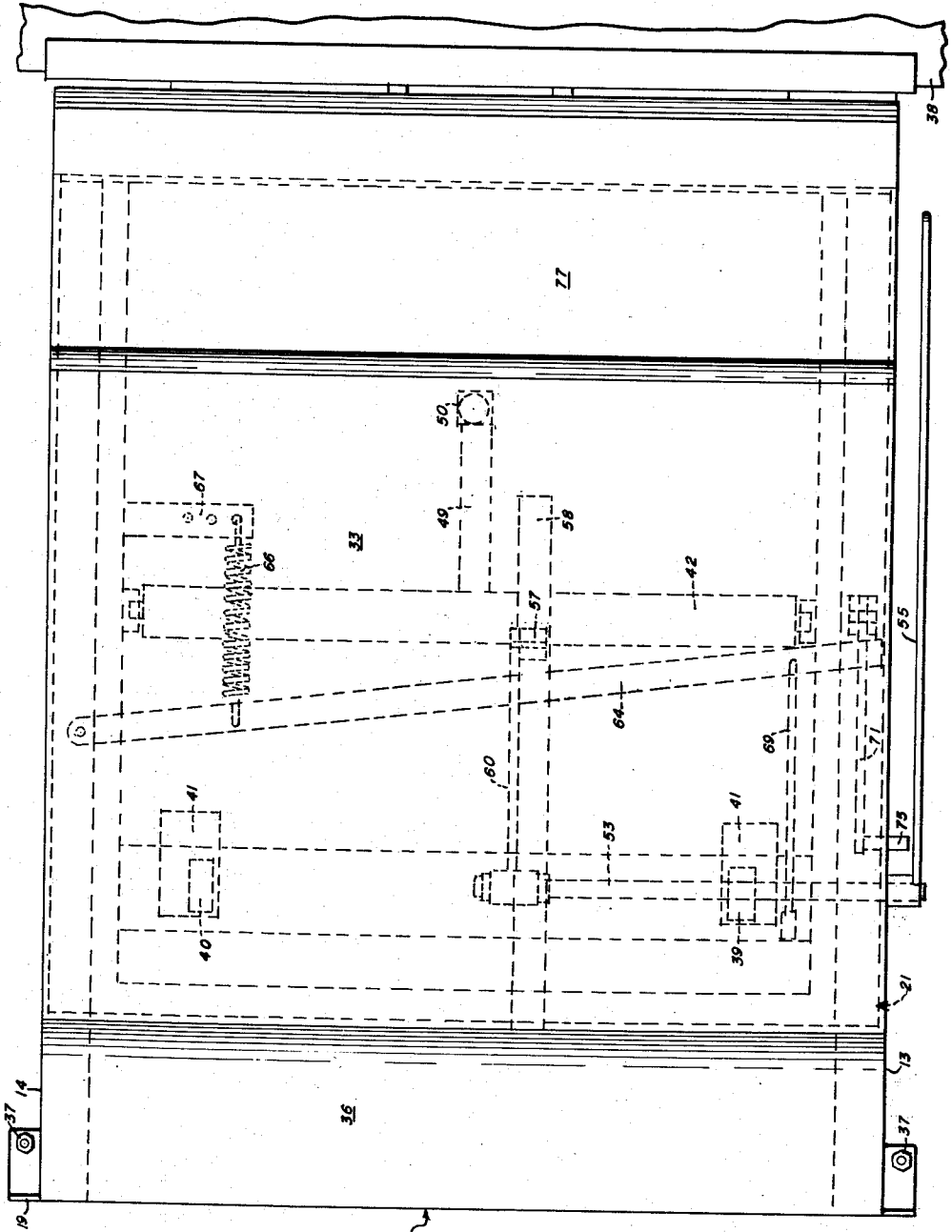
Figure 3:
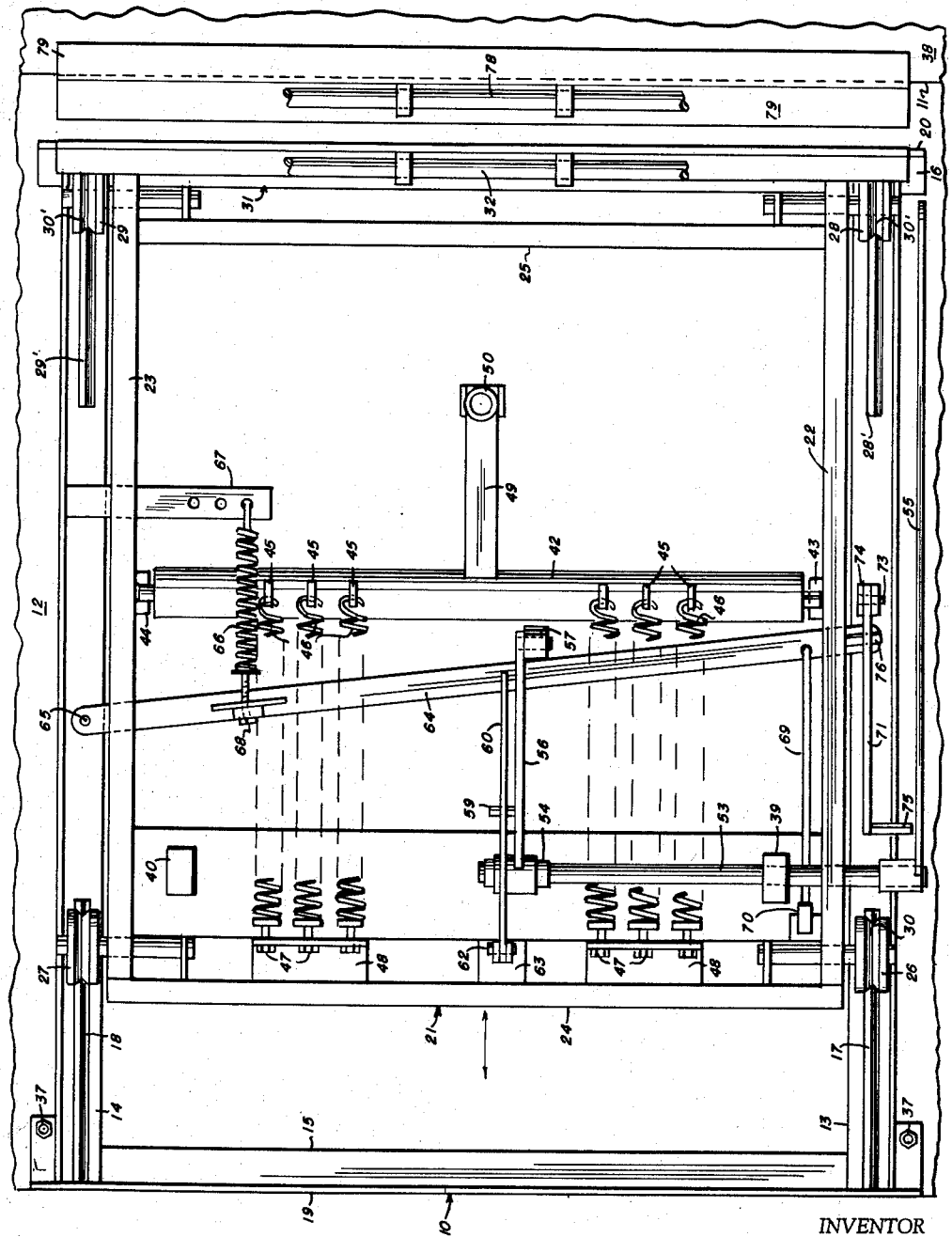
Figure 4:
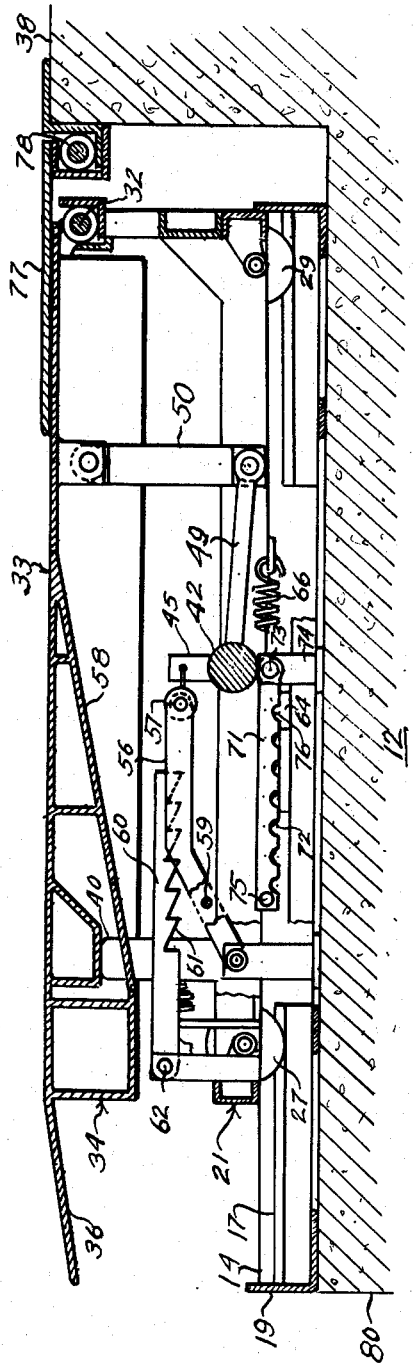
Figure 5:
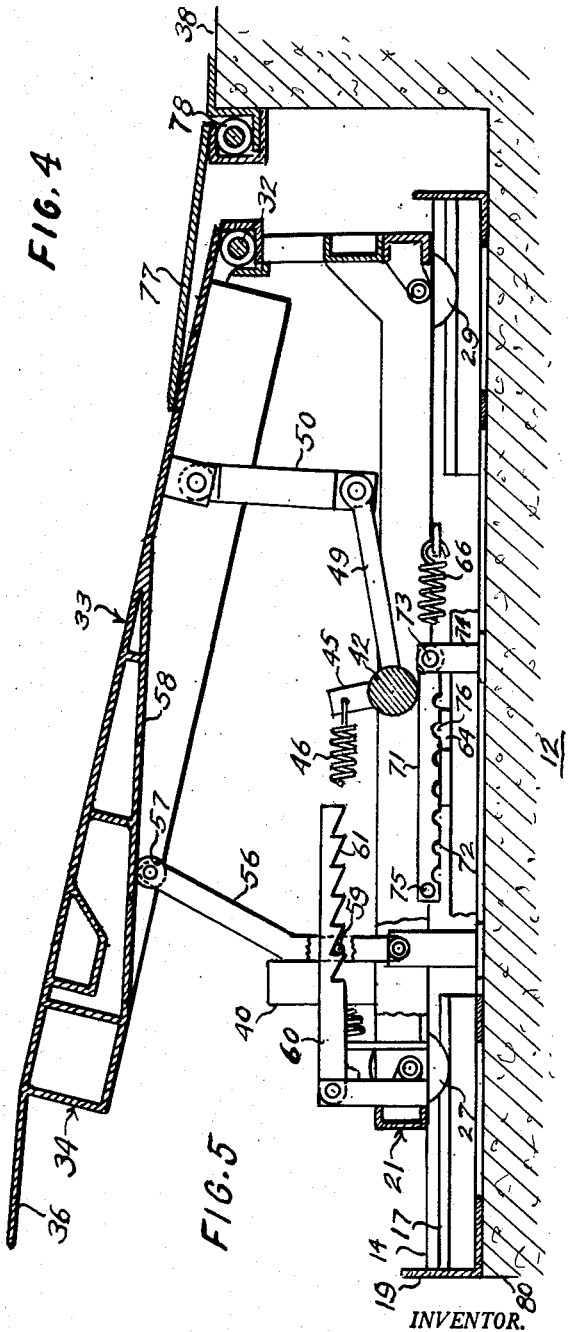

Further objects and advantages of the invention will be apparent from the following description taken in conjunction with the accompanying drawings wherein:

FIG. 1 is a side elevational view of a manually operated dockboard constructed in accordance with this invention and with the same installed in an upwardly and forwardly opening recess in a loading platform;

FIG. 2 a top plan view of the dockboard shown in FIG. 1;

FIG. 3 a plan view of the dockboard of this invention with the ramp removed in order to better show the internal mechanism of the dockboard;

FIG. 4, a longitudinal sectional view showing the relative positions of the various operating parts, with the dockboard in retracted, lowered position; and, FIG. 5 a longitudinal sectional view similar to FIG. 4, showing the relative positions of the various operating parts, with the dockboard in partially advanced elevated position.

With continued reference to the drawing, there is shown a manually operated dockboard constructed in accordance with this invention and which may well comprise a generally rectangular frame 10 for mounting in an upwardly and outwardly opening recess 11 in a loading platform 12. The frame 10 may be provided with side members 13 and 14 and with front and rear end cross members 15 and 16 respectively. The side member 13 serves to support a rail 17 and the side member 14 serves to support a rail 18. Rails 17 and 18 may, if desired, be of inverted V formation as shown, or may be of any other suitable cross sectional shape. End cross member 15 is provided with an upwardly extending flange 19 providing a front stop and end cross member 16 is provided with an upwardly extending flange 20 providing a rear stop. The purpose of the front and rear stops 19 and 20 will be lated described.

A generally rectangular carriage 21 comprising side bars 22 and 23 and front and rear cross bars 24 and 25 respectively is provided with front rollers 26 and 27 and with rear rollers 28 and 29. The rollers 26 and 27 are each provided with a V-groove 30 which engages the tracks 17 and 18 and the rollers 28 and 29 are each provided with a V groove 30' which engages tracks 28' and 29'. The engagement of the rollers 26, 27, 28 and 29 with the tracks 17, 18, 28' and 29' serve to support the carriage 21 for forward and rearward movement thereon between the front stop 19 and the rear stop 20 and also to maintain the carriage assembly 21 in alignment with respect to the frame 10.

An upwardly extending transverse support 31 is mounted on the carriage 21 at the rear end thereof and the support 31 is provided at the upper end thereof with a transversely extending hinge pin 32 for hingedly mounting a generally rectangular ramp 33 which overlies the carriage 21. The ramp 33 consists of a suitable framework 34 covered by a flat plate 35 and the ramp 33 terminates at the forward end in a forwardly extending lip 36, the purpose of which will be later described.

As above stated, the frame 10 is installed in an upwardly and forwardly opening recess 11 in a loading platform 12 and the frame 10 may be secured in place by L bolts 37 or by any other suitable fastening means and, as clearly shown in full lines in FIG. 1, the upper surface of the plate 35 of the ramp 33 is level with the upper surface 38 of the loading platform 12 when the ramp 33 is in horizontal position. In order to support the ramp 33 in horizontal position, upwardly extending abutments 39 and 40 are provided on the frame 10 and such abutments project upwardly and engage a portion 41 of the frame 34 of the ramp 33 when the ramp 33 is in horizontal position as clearly shown in FIG. 1.

In order to at least partially counter-balance the weight of the ramp 33 there is provided a rock shaft 42 disposed transversely of the carriage 21 and mounted in bearings 43 and 44 secured to the side bars 22 and 23 respectively of the carriage 21. The rock shaft 42 is provided with a plurality of upwardly projecting spaced ears 45 and a tension spring 46 is connected to each ear. The opposite ends of the tension springs 46 are adjustably connected at 47 to brackets 48 mounted on the front cross bar 24 of the carriage 21. An arm 49 is fixed to the rock shaft 42 substantially midway of the length thereof and the arm 49 extends rearwardly and is pivotally connected to an upwardly extending link 50. The opposite end of the link 50 is pivotally connected at 51 to the ramp 33 and it will be seen that by this structure the tension springs 46 serve to at least partially counter-balance the weight of the ramp 33. While a single rearwardly extending arm 49 is shown for purposes of illustration, it is to be understood that a plurality of such arms and links connecting the same to the ramp 33 may be utilized, if desired, but it has been found that a single arm 49 and link 50 is sufficient for most structures.

An elongated slot 52 is provided in the side bar 22 of the carriage 21 and a cam shaft 53 extends through the slot 52 and is mounted on a bearing 54 extending upwardly from the frame 10 and a bearing provided in the abutment 39 also extending upwardly from the frame 10. As clearly shown in FIG. 3, the cam shaft 53 projects outwardly of the frame 10 and mounted on the outer end of the shaft 53 is an operating lever 55. A rearwardly extending cam lever 56 is fixed to the cam shaft 53 substantially midway of the width of the ramp 33 and mounted on the rear end of the cam lever 56 is a cam roller 57. An upwardly and rearwardly inclined cam track 58 is attached to the under side of the ramp 33 within the framework 34 and the cam track 58 is disposed in the path of movement of the cam roller 57. The cam lever 56 is also provided with a laterally projecting pin 59. A ratchet bar 60 provided with a plurality of downwardly facing teeth 61 is pivotally mounted at 62 on a bracket 63 carried by the front cross bar 24 of the carriage 21 and as clearly shown in FIG. 3, the ratchet bar 60 is disposed in the path of movement of the pin 59 and it is to be noted that the ratchet bar 60 is pivotally mounted for vertical movement.

A carriage return bar 64 is pivotally mounted at 65 on the side member 14 of the frame 10 and as clearly shown in FIGS. 1 and 3, the return bar 64 extends across the frame 10 above the opposite side member 13 and below the carriage 21. A return spring 66 is connected at one end to a bracket 67 mounted on the side member 14 of the frame 10 and the opposite end of the spring 66 is adjustably connected at 68 to the carriage return bar 64. As shown in FIG. 3, a link 69 is connected at one end to the carriage return bar 64 and the opposite end of the link 69 is connected at 70 to the carriage 21. A tooth locking bar 71 having downwardly facing teeth 72 is pivotally mounted at 73 for vertical movement on a bracket 74 extending upwardly from the side member 13 of the frame 10 and the locking bar 71 is provided with a laterally projecting handle 75 for conveniently actuating the same. As clearly shown in FIGS. 1 and 3, the carriage return bar 64 projects below the locking bar 71 and provided on the upper side of the return bar 64 is a pawl 76 for engaging the teeth 72 on the locking bar 71.

In order to bridge the gap between the ramp 33 and the inner edge of the recess 11 in the loading platform 12, there may be provided an auxiliary ramp 77 which may comprise a flat metal plate pivotally mounted at the rear edge thereof on a hinge pin 78 carried by a bracket 79 which is turn is secured to the loading platform 12. As clearly shown in FIG. 1, the auxiliary ramp 77 merely rests on the upper surface of the plate 35 of the ramp 33 and the auxiliary ramp 77 may move vertically about the hinge pin 78 and slide on the upper surface of the ramp 33. Consequently, regardless of the position of the ramp 33, the auxiliary ramp 77 will bridge the gap between the ramp 33 and the upper surface 38 of the loading platform 12. If desired, the forward edge 80 of the loading platform 12 may be provided with one or more suitable bumpers 81 to engage and absorb the shock of a truck backing into position at the loading platform, which truck is to be subsequently engaged by the ramp of the loading dock of this invention.

The operation of the dockboard of this invention will now be described with particular reference to FIG. 1 as well as FIGS. 4 and 5, and with the apparatus in the position shown in full lines in FIGS. 1 and 4, it is assumed that a truck to be loaded or unloaded has backed into position adjacent the outer edge 80 of the loading platform 12 and thereupon the operating lever 55 is moved in the direction shown by the arrows in FIG. 1, at which time the cam roller 57 engages the inclined cam track 58 and raises the ramp 33 to the position shown in dotted lines in FIG. 1 and in full lines in FIG. 5. Continued movement of the operating lever 55 to the position shown in dotted lines in FIG. 1 causes the laterally projecting pin 59 on the cam lever 56 to engage one of the teeth 61 on the ratchet bar 60 and thereby move the ramp 31 and carriage 21 forwardly on the tracks 17 and 18 as shown in FIG. 5, and oscillating movement of the lever 55 will cause the pin 59 to engage successive teeth 61 on the ratchet bar 60 and thereby move the ramp 33 forwardly the desired distance until the lip 36 on the ramp 33 is disposed above the body of the truck. Upon reaching this position, the operating lever 55 may be returned to the normal inoperative position as shown in full lines in FIG. 1 and this will permit the ramp 33 to lower until the forward edge of the lip 36 contacts the upper surface of the truck body. This downward movement of the ramp 33 is, of course, counter-balanced to a great extent by the tension spring 46.

During forward movement of the ramp 33 and carriage 21 by operation of the operating lever 55, the link 69 attached to the carriage 21 will pull the carriage return bar 64 forwardly as shown in FIG. 5, against the action of return spring 66 and as the pawl 76 on the return bar 64 moves forwardly, the same will successively engage the teeth 72 on the locking bar 71. Engagement of the pawl 76 with the teeth 72 on the locking bar 71 will operate to hold the ramp 33 and carriage 21 in forward position against the action of return spring 66. When the loading or unloading operation has been completed, it is only necessary to raise the locking bar 71 by actuation of the handle 75 to release the teeth 72 of the locking bar 71 from the pawl 76 on the return bar 64, at which time the action of return spring 66 will operate to pull the return bar 64 rearwardly and through the link 69 will move the ramp 33 and carriage 21 rearwardly until the rear rollers 28 and 29 contact the rear stop 20. At this time, the ramp 33 and carriage 21 are in the full line positions as shown in FIG. 1, with the upper surface 35 of the ramp 33 level with the upper surface 38 of the loading platform 12.

During the previously described operation, the auxiliary ramp 77 will, of course, pivot about the hinge pin 78 as the ramp 33 moves upwardly to the dotted line position shown in FIG. 1 and as the ramp 33 moves forwardly the same will slide on the auxiliary ramp 77 and upon lowering of the ramp 33 onto the truck body, the auxiliary ramp 77 will also lower by means of gravity and consequently, it will be seen that regardless of the position of the ramp 33 and the carriage 21 the auxiliary ramp 77 will at all times, bridge the gap between the ramp 33 and the upper surface 38 of the loading platform 12.

It will be obvious by the above described invention there has been provided a relatively simple, yet highly effective dockboard which may be conveniently installed in a loading platform and manually operated to properly engage a truck body for loading or unloading operations. While manual operation is required to properly position the dockboard on the truck body, nevertheless, the same is automatically returned to inoperative position merely by the release of a locking bar.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A manually operated dockboard comprising a generally rectangular frame for mounting in an upwardly and outwardly opening recess in a loading platform, said frame having side members and front and rear end cross members, a rail on each side member, said end cross members projecting above said rails to provide front and rear stops, a generally rectangular carriage having side bars and front and rear cross bars, rollers on said carriage engaging said rails to support said carriage for forward and rearward movement between said stops, an upwardly extending transverse support at the rear end of said carriage, a generally rectangular ramp hingedly mounted at the rear end on said support and overlying said carriage, a forwardly extending lip on the front end of said ramp, an upwardly extending abutment on said frame engageable with said ramp for supporting the same in substantially horizontal position, a rock shaft disposed transversely of said carriage and rotatably mounted thereon, a plurality of spaced ears projecting upwardly from said rock shaft, tension springs connected at one end to each ear, the opposite ends of said springs being adjustably connected to the front end cross bar on said carriage, an arm extending rearwardly from said rock shaft and a link connecting said arm and said ramp, whereby said springs serve to partially counter-balance the weight of said ramp, an elongated slot in one side bar of said carriage, upstanding spaced bearings on said frame, a cam shaft mounted in said bearings and extending through said slot, an operating lever on the outer end of said cam shaft, a rearwardly extending cam lever fixed to said cam shaft substantially midway of the width of said ramp, a cam roller on the rear end of said cam lever, an upwardly and rearwardly inclined cam track on said ramp disposed in the path of movement of said cam roller, a laterally projecting pin on said cam lever, a tooth ratchet bar pivotally mounted on the front cross bar of said carriage and extending rearwardly in the path of movement of said pin, a carriage return bar pivotally mounted at one end on one side member of said frame and the free end extending across said frame above the opposite side member and below said carriage, an adjustable return spring fixed to said return bar and a bracket on said frame, a link connecting said return bar and said carriage, a tooth locking bar pivotally mounted on said frame above the free end of said return bar and means on said return bar releasably engageable with said locking bar, whereby upon movement of said operating lever in one direction said cam roller will engage said cam track to raise said ramp and said pin will engage a tooth on said ratchet bar to move said carriage and ramp forwardly, the means on said return bar engaging a tooth on said locking bar to retain said carriage and ramp in forward position, and upon actuation of said locking bar said return spring will operate to return said carraige and ramp to rearward position.

2. A manually operated dockboard comprising a generally rectangular frame for mounting in an upwardly and outwardly opening recess in a loading platform, said frame having side members and front and rear end cross members, a rail on each side member, a generally rectangular carriage having side bars and front and rear cross bars, rollers on said carriage engaging said rail to support said carriage for forward and rearward movement, a transverse support at the rear end of said carriage, a generally rectangular ramp hingedly mounted at the rear end on said support and overlying said carriage, an upwardly extending abutment on said frame engageable with said ramp for supporting the same in substantially horizontal position, a rock shaft disposed transversely of said carriage and rotatably mounted thereon, a plurality of spaced ears projecting upwardly from said rock shaft, tension springs connected at one end to each ear, the opposite ends of said springs being adjustably connected to the front end cross bar on said carriage, an arm extending rearwardly from said rock shaft and a link connecting said arm and said ramp, whereby said springs serve to partially counter-balance the weight of said ramp, an elongated slot in one side bar of said carriage, upstanding spaced bearings on said frame, a cam shaft mounted in said bearings and extending through said slot, an operating lever on the outer end of said cam shaft, a rearwardly extending cam lever fixed to said cam shaft substantially midway of the width of said ramp, a cam roller on the rear end of said cam lever, an upwardly and rearwardly inclined cam track on said ramp disposed in the path of movement of said cam roller, a laterally projecting pin on said cam lever, a tooth ratchet bar pivotally mounted on the front cross bar of said carriage and extending rearwardly in the path of movement of said pin, a carriage return bar pivotally mounted at one end on one side member of said frame and the free end extending across said frame above the opposite side member and below said carriage, an adjustable return spring fixed to said return bar and a bracket on said frame, a link connecting said return bar and said carriage, a toothed locking bar pivotally mounted on said frame above the free end of said return bar and means on said return bar releasably engageable with said locking bar, whereby upon movement of said operating lever in one direction said cam roller will engage said cam track to raise said ramp and said pin will engage a tooth on said ratchet bar to move said carriage and ramp forwardly, the means on said return bar engaging a tooth on said locking bar to retain said carriage and ramp in forward position, and upon actuation of said locking bar said return spring will operate to return said carriage and ramp to rearward position.

3. A manually operated dockboard comprising a generally rectangular frame for mounting in an upwardly and outwardly opening recess in a loading platform, said frame having side members and front and rear end cross members, a rail on each side member, a generally rectangular carriage having side bars and front and rear cross bars, rollers on said carriage engaging said rail to support said carriage for forward and rearward movement, a transverse support at the rear end of said carriage, a generally rectangular ramp hingedly mounted at the rear end on said support and overlying said carriage, an abutment on said frame engageable with said ramp for supporting the same in substantially horizontal position, a rock shaft disposed transversely of said carriage and rotatably mounted thereon, a plurality of spaced ears on said rock shaft, tension springs connected at one end to each ear, the opposite ends of said springs being adjustably connected to the front end cross bar on said carriage, an arm extending from said rock shaft and a link connecting said arm and said ramp, whereby said springs serve to partially counter-balance the weight of said ramp, an elongated slot in one side bar of said carriage, upstanding spaced bearings on said frame, a cam shaft mounted in said bearings and extending through said slot, an operating lever on the outer end of said cam shaft, a rearwardly extending cam lever fixed to said cam shaft substantially midway of the width of said ramp, a cam roller on the rear end of said cam lever, an upwardly and rearwardly inclined cam track on said ramp disposed in the path of movement of said cam roller, a laterally projecting pin on said cam lever, a toothed ratchet bar pivotally mounted on the front cross bar of said carriage and extending rearwardly in the path of movement of said pin, a carriage return bar pivotally mounted at one end on one side member of said frame and the free end extending across said frame above the opposite side member and below said carriage, an adjustable return spring fixed to said return bar and a bracket on said frame, a link connecting said return bar and said carriage, a toothed locking bar pivotally mounted on said frame above the free end of said return bar and means on said return bar releasably engageable with said locking bar, whereby upon movement of said operating lever in one direction said cam roller will engage said cam track to raise said ramp and said pin will engage a tooth on said ratchet bar to move said carriage and ramp forwardly, the means on said return bar engaging a tooth on said locking bar to retain said carriage and ramp in forward position, and upon actuation of said locking bar said return spring will operate to return said carriage and ramp to rearward position.

4. A manually operated dockboard comprising a generally rectangular frame for mounting in an upwardly and outwardly opening recess in a loading platform, said frame having side members and front and rear end cross members, a rail on each side member, a generally rectangular carriage having side bars and front and rear cross bars, rollers on said carriage engaging said rail to support said carriage for forward and rearward movement, a transverse support at the rear end of said carriage, a generally rectangular ramp hingedly mounted at the rear end on said support and overlying said carriage, an abutment on said frame engageable with said ramp for supporting the same in substantially horizontal position, a rock shaft disposed transversely of said carriage and rotatably mounted thereon, an ear on said rock shaft, a tension spring connected at one end to said ear, the opposite end of said spring being connected to said carriage, an arm extending from said rock shaft and a link connecting said arm and said ramp, whereby said spring serves to partially counter-balance the weight of said ramp, spaced bearings on said frame, a cam shaft mounted in said bearings and extending outwardly of said carriage, an operating lever on the outer lever of said cam shaft, a cam lever fixed to said cam shaft, a cam roller on said cam lever, an upwardly and rearwardly inclined cam track on said ramp disposed in the path of movement of said cam roller, a laterally projecting pin on said cam lever, a toothed ratchet bar pivotally mounted on the front cross bar of said carriage and extending rearwardly in the path of movement of said pin, a carriage return bar pivotally mounted on one end on one side member of said frame and the free end extending across said frame above the opposite side member and below said carriage, an adjustable return spring fixed to said return bar and a bracket on said frame, a link connecting said return bar and said carriage, a toothed locking bar pivotally mounted on said frame above the free end of said return bar and means on said return bar releasably engageable with said locking bar, whereby upon movement of said operating lever in one direction said cam roller will engage said cam track to raise said ramp and said pin will engage a tooth on said ratchet bar to move said carriage and ramp forwardly, the means on said return bar engaging a tooth on said locking bar to retain said carriage and ramp in forward position, and upon actuation of said locking bar said return spring will operate to return said carriage and ramp to rearward position.

5. A manually operated dockboard comprising a generally rectangular frame for mounting in an upwardly and outwardly opening recess in a loading platform, said frame having side members and front and rear end cross members, a rail on each side member, a generally rectangular carriage having side bars and front and rear cross bars, rollers on said carriage engaging said rail to support said carriage for forward and rearward movement, a transverse support at the rear end of said carriage, a generally rectangular ramp hingedly mounted at the rear end on said support and overlying said carriage, an abutment on said frame engageable with said ramp for supporting the same in substantially horizontal position, a rock shaft disposed transversely of said carriage and rotatably mounted thereon, an ear on said rock shaft, a tension spring connected at one end to said ear, the opposite end of said spring being connected to said carriage, an arm extending from said rock shaft and a link connecting said arm and said ramp, whereby said spring serves to partially counter-balance the weight of said ramp, spaced bearings on said frame, a cam shaft mounted in said bearings and extending outwardly of said carriage, an operating lever on the outer end of said cam shaft, a cam lever fixed to said cam shaft, a cam roller on said cam lever, a cam track on said ramp disposed in the path of movement of said cam roller, a laterally projecting pin on said cam lever, a toothed ratchet bar pivotally mounted on said carriage and extending in the path of movement of said pin, a carriage return bar pivotally mounted at one end on one side member of said frame and the free end extending across said frame above the opposite side member and below said carriage, an adjustable return spring fixed to said return bar and a bracket on said frame, a link connecting said return bar and said carriage, a toothed locking bar pivotally mounted on said frame above the free end of said return bar and means on said return bar releasably engageable with said locking bar, whereby upon movement of said operating lever in one direction said cam roller will engage said cam track to raise said ramp and said pin will engage a tooth on said ratchet bar to move said carriage and ramp forwardly, the means on said return bar engaging a tooth on said locking bar to retain said carriage and ramp in forward position, and upon actuation of said locking bar said return spring will operate to return said carriage and ramp to rearward position.

6. A manually operated dockboard comprising a generally rectangular frame for mounting in an upwardly and outwardly opening recess in a loading platform, said frame having side members and front and rear end cross members, a rail on each side member, a generally rectangular carriage having side bars and front and rear cross bars, rollers on said carriage engaging said rails to support said carriage for forward and rearward movement, a transverse support at the rear end of said carriage, a generally rectangular ramp hingedly mounted at the rear end on said support and overlying said carriage, an abutment on said frame and engageable with said ramp for supporting the same in substantially horizontal position, means to partially counter-balance the weight of said ramp, bearings on said frame, a cam shaft mounted in said bearings and extending outwardly of said carriage, an operating lever on the outer end of said cam shaft, a cam lever fixed to said cam shaft, a cam roller on said cam lever, a cam track on said ramp disposed in the path of movement of said cam roller, a laterally projecting pin on said cam lever, a toothed ratchet bar pivotally mounted on said carriage and extending in the path of movement of said pin, a carriage return bar pivotally mounted on said frame and extending across said frame below said carriage, a return spring fixed to said return bar and said frame, a link connecting said return bar and said carriage, a toothed locking bar pivotally mounted on said frame above said return bar and means on said return bar releasably engageable with said locking bar, whereby upon movement of said operating lever in one direction said cam roller will engage said cam track to raise said ramp and said pin will engage a tooth on said ratchet bar to move said carriage and ramp forwardly, the means on said return bar engaging a tooth on said locking bar to retain said carriage and ramp in forward position, and upon actuation of said locking bar said return spring will operate to return said carriage and ramp to rearward position.

7. A manually operated dockboard comprising a generally rectangular frame for mounting in an upwardly and outwardly opening recess in a loading platform, said frame having side members and front and rear end cross members, a rail on each side member, a generally rectangular carriage having side bars and front and rear cross bars, rollers on said carriage engaging said rails to support said carriage for forward and rearward movement, a transverse support on said carriage, a generally rectangular ramp hingedly mounted on said support and overlying said carriage, an abutment on said frame engageable with said ramp for supporting the same in substantially horizontal position, means to partially counter-balance the weight of said ramp, bearings on said frame, a cam shaft mounted in said bearings and extending outwardly of said carriage, an operating lever on the outer end of said cam shaft, a cam lever fixed to said cam shaft, a cam roller on said cam lever, a cam track on said ramp disposed in the path of movement of said cam roller, a laterally projecting pin on said cam lever, a toothed ratchet bar pivotally mounted on said carriage and extending in the path of movement of said pin, a carriage return bar pivotally mounted on said frame and extending across said frame, a return spring fixed to said return bar and said frame, a link connecting said return bar and said carriage, a toothed locking bar pivotally mounted on said frame, and means on said return bar releasably engageable with said locking bar, whereby upon movement of said operating lever in one direction said cam roller will engage said cam track to raise said ramp and said pin will engage a tooth on said ratchet bar to move said carriage and ramp forwardly, the means on said return bar engaging a tooth on said locking bar to retain said carriage and ramp in forward position, and upon actuation of said locking bar said return spring will operate to return said carriage and ramp to forward position.

8. A dockboard comprising a generally rectangular frame for mounting in an upwardly and outwardly opening recess in a loading platform, said frame having side members and front and rear end cross members, a rail on each side member, a generally rectangular carriage having side bars and front and rear cross bars, rollers on said carriage engaging said rails to support said carriage for forward and rearward movement, a transverse support on said carriage, a generally rectangular ramp hingedly mounted on said support and overlying said carriage, an abutment on said frame engageable with said ramp for supporting the same in substantially horizontal position, means to partially counter-balance the weight of said ramp, a shaft, an operating lever fixed to said shaft, means connected to said shaft and engaging said ramp for raising and lowering said ramp upon operation of said lever, carriage advancing means operatively associated with said raising and lowering means and including a toothed ratchet bar and a pin engageable with said ratchet bar upon movement of one toward the other, whereby upon operation of said raising and lowering means said ratchet bar and said pin will move into engagement and continued movement of said raising and lowering means will move said carriage and ramp forwardly, means carried by said carriage for movement therewith and means on said frame releasably engaging said last named means for retaining said carriage and ramp in forward position and a carriage and ramp return spring connected to said frame and carriage, whereby upon release of said releasable means said spring will return said carriage and ramp to original position.

References Cited in the file of this patent
UNITED STATES PATENTS

| | | |
|---|---|---|
| 32,846 | Virdin | July 16, 1861 |
| 1,821,327 | Scott | Sept. 1, 1931 |
| 2,527,653 | Pierce | Oct. 31, 1950 |
| 2,689,965 | Fenton | Sept. 28, 1954 |
| 2,908,024 | Holleen | Oct. 13, 1959 |

FOREIGN PATENTS

| | | |
|---|---|---|
| 1,183,087 | France | Jan. 26, 1959 |